ns such a way that the axis of rotation of the crank is movable between a pendulum operating position and an additional position effecting the wiper blade rest position. The eccentric bush comprises a separate drive motor adjusting mechanism which is independent of the pendulum drive, so that the wiping movement of the wiper blade can also be effected immediately when the wiper device is switched on.

United States Patent [19]

Kühbauch

[11] Patent Number: 5,012,525
[45] Date of Patent: May 7, 1991

[54] VEHICLE WINDSHIELD WIPER DEVICE

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 473,947

[22] PCT Filed: Aug. 5, 1988

[86] PCT No.: PCT/DE88/00482
§ 371 Date: Feb. 9, 1990
§ 102(e) Date: Feb. 9, 1990

[87] PCT Pub. No.: WO89/01886
PCT Pub. Date: Mar. 9, 1989

[51] Int. Cl.[5] .................................................. B60S 1/22
[52] U.S. Cl. ................................ 15/250.16; 15/250.13; 74/600
[58] Field of Search .......... 15/250.16, 250.17, 250.13, 15/250.21, 250.30; 74/600, 522, 571 M

[56] References Cited

U.S. PATENT DOCUMENTS

| | | | |
|---|---|---|---|
| 3,091,128 | 5/1963 | DeRees et al. | 15/250.17 |
| 3,242,520 | 3/1966 | Carroll et al. | 74/600 |
| 3,353,425 | 11/1967 | Abel, Jr. | 74/600 |
| 3,616,702 | 11/1971 | Kolb | 15/250.17 |
| 3,808,629 | 5/1974 | Druseikis | 74/600 |
| 4,791,698 | 12/1988 | Murata | 15/250.16 |
| 4,794,818 | 1/1989 | Eustache | 15/250.16 |

FOREIGN PATENT DOCUMENTS

| | | | |
|---|---|---|---|
| 911701 | 5/1954 | Fed. Rep. of Germany | 15/250.16 |
| 2655078 | 6/1978 | Fed. Rep. of Germany | 15/250.13 |
| 2840203 | 3/1980 | Fed. Rep. of Germany | . |
| 411012 | 6/1945 | Italy | 15/250.16 |

Primary Examiner—Harvey C. Hornsby
Assistant Examiner—Gary K. Graham
Attorney, Agent, or Firm—Michael J. Striker

[57] ABSTRACT

A device for wiping a windshield of motor vehicles comprises a wiper blade which brushes over a wiping field located between two oscillating reversing positions and which is securely connected with a rocker shaft via a wiper arm, and which can be placed in a rest position which is located prior to the wiping field as seen in one oscillating direction. The wiper device has a drive comprising an electrical drive motor and a crank operatively connected with the drive motor and forming a part of a pendulum gear unit which transmit the rotating movement of the drive motor into an oscillating movement of the rocker shaft. The crank is additionally supported with a shaft in an eccentric bush rotatable between two positions relative to a device housing in such a way that the axis of rotation of the crank is movable between a pendulum operating position and an additional position effecting the wiper blade rest position. The eccentric bush comprises a separate drive motor adjusting mechanism which is independent of the pendulum drive, so that the wiping movement of the wiper blade can also be effected immediately when the wiper device is switched on.

13 Claims, 3 Drawing Sheets

5,012,525

VEHICLE WINDSHIELD WIPER DEVICE

BACKGROUND OF THE INVENTION

The invention is relates to a wiper device comprising an electric motor and a crank for translating rotational movement of the motor shaft into oscillating movement of a rocker shaft connected with a wiper arm. The crank is supported in an eccentric bush movable between two positions with respect to the device housing in one of which the wiper blade is in a rest position thereof. A wiper device is already known (DE-OS 18 12 307) in which the drive device is provided with a construction comprising magnet and locking means which is costly and susceptible to failure and which enables the rotating movement of the eccentric bush when the wiper device is to be stopped. However, this rotating movement can only be initiated and carried out after the last pendulum stroke is concluded. Also when starting the wiper device, the pendulum movement can only be effected after the rotational restoring movement of the eccentric bush has been concluded, so that valuable time is lost in certain traffic situations before the necessary wiping pendulum movement of the wiper blade can be carried out. In addition, the noises occurring during locking are annoying.

It is also known (DE-OS 32 18 373) to arrange an adjusting mechanism on a rocker belonging to the pendulum gear unit and to adjust the point of articulation between a connecting rod and the rocker with this adjusting mechanism, so that there is an additional swiveling movement of the wiper blade into the rest or parked position located outside of the wiping field.

However, this solution requires additional space which is not available in the area of the rocker. Moreover, it is a disadvantage in this solution that the supply cable of the adjusting mechanism must compensate for the pendulum movement of the rocker occurring during the wiping operation of the wiper device and the adjusting mechanism increases the mass to be moved.

SUMMARY OF THE INVENTION

The object of the invention is a wiper device, in which the adjusting mechanism of the eccentric bush can be integrated in the drive device, which is arranged so as to be stationary with respect to a frame, so that a compact drive unit results which also solves the other problems of the known wiper devices.

The present invention both as to its construction so to its mode of operation, together with additional objects and advantages thereof, will be best understood from the following detailed description of the preferred embodiments when read with reference to the accompanying drawings.

DESCRIPTION OF THE PREFERRED EMBODIMENTS

Figure 1:
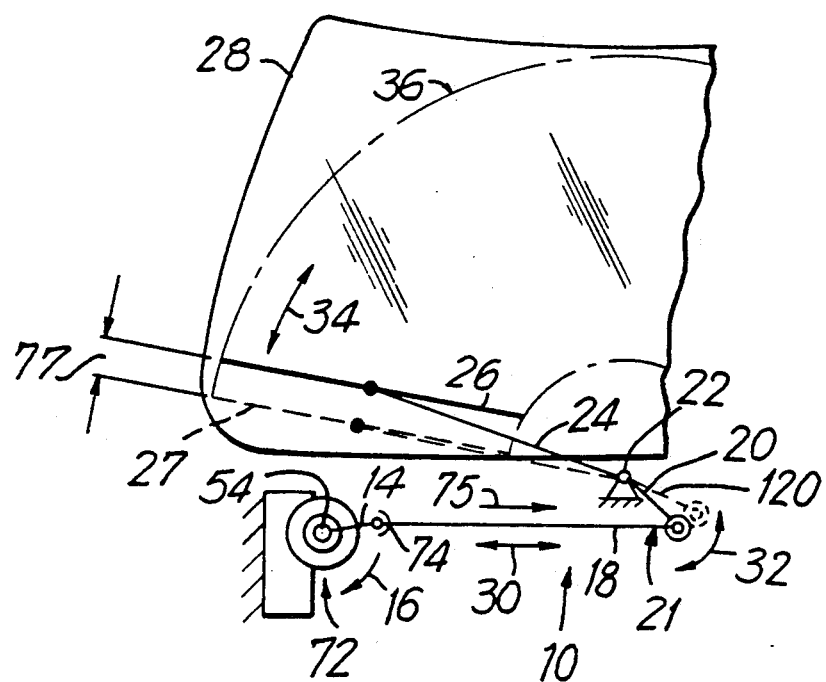
FIG. 1 shows a schematic view of an oscillating wiper device in which the wiper blade is placed in a rest or parked position located outside the wiping field.

A wiping device 10 shown in FIG. 1 comprises a drive device 12 which drives a crank 14 for rotating the same in the direction of arrow 16. One end of a connecting rod 18 is articulated at the crank 14, the other end being pivotable connected with the free end of a rocker 20. The other end of the rocker is fastened to a rocker shaft 22 which is supported so as to be stationary with respect to a frame, one end of a wiper arm 24 being arranged at the rocker shaft 22. A wiper blade 26, which contacts a windshield 28 of a motor vehicle, not shown, is held at the other end of the wiper arm 24. When the crank 14 rotates in the direction of the arrow 16 during operation of the wiper device 10, the connecting rod 18 is moved in the direction of the double arrow 30, so that the rocker 20 moves in a pendulum-like manner around the axis of the rocker shaft 22 in the direction of the double arrow 32. This pendulum movement is also transmitted to the wiper arm 24 and, accordingly, to the wiper blade 26 which accordingly moves in a pendulum-like manner over the windshield 28 in the direction of the double arrow 34 and in so doing brushes over a wiping field which is designated by 36. Together with the connecting rod 18 and the rocker 20, the crank 14 forms a pendulum gear unit 21 which transforms the output rotational movement of the drive mechanism 12 into a pendulum movement which is indicated by the arrows 32 and 34.

Figure 3:
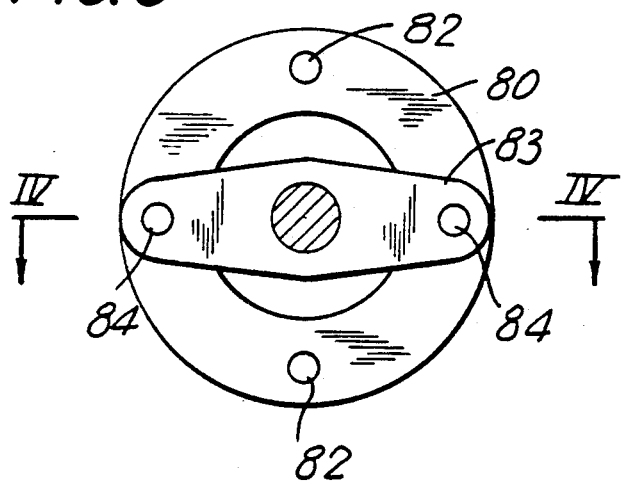
FIG. 3 shows a partial cross-sectional view of the gear unit along line III-III in FIG. 2.
Figure 4:
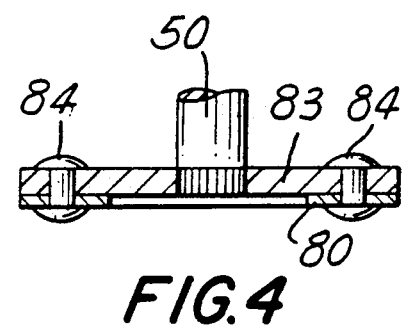
FIG. 4 shows a cross-sectional view of the arrangement according to FIG. 3 along line IV-IV.

The drive mechanism 12 comprises an electrical drive motor 40 (FIG. 2) whose armature shaft is constructed as a worm shaft 42 which meshes with a worm wheel 44. The worm wheel 44 is supported on a pivot pin 46 which in turn is supported in a housing 49 enclosing the drive mechanism 12. A shaft 50, which is supported in an eccentric bush 54 via a spherical bearing 52, is arranged approximately along an extension of the axis 48 of rotation of the pivot pin 46. The eccentric bush 54 is constructed in a pot-shaped manner, and the spherical bearinq 52 is integrated in the pot shaped base 56. The spherical bearing 52 is received in the eccentric bush 54 in such a way that a cylinder bore hole 58 guiding the shaft 50 is arranged in the cup-shaped bearing 52 so as to be eccentric relative to the outer surface area 60 of the eccentric bush 54. Moreover, the pot-shaped eccentric bush 54 comprises an annular collar 62 forming the rim of the pot, its outer surface area being provided with teeth in such a way that this annular collar forms a worm wheel which meshes with a worm shaft 63 which is in a operative connection with an additional drive motor 64. The worm wheel 62, together with the worm 63, forms an adjusting mechanism 66 by which the eccentric bush 54 can be rotated around the axis located in the center of the outer surface area 60. Since the longitudinal axis 68 of the shaft 50 intersects the rotation axis 48 of the worm wheel 44 near the end face of the worm wheel 44 facing it, but the shaft 50 is eccentrically supported in the eccentric bush 54 on the other hand, the axis 48 of rotation of the worm wheel 44 is not aligned with the longitudinal axis 68 of the shaft 50, which is also designated as crank rotation axis as follows. The shaft 50 projects out of the pot base 56 with an end portion 70 and is provided with a crank arm 72 whose one end is securely connected with the shaft 50. A cup-shaped crank pin 74 is fastened to the other free end of the crank arm 72 (FIGS. 1 and 2), the connecting rod 18 acts at the cup-shaped crank pin 74. It can be seen in addition from FIG. 2 that the worm wheel 44 has two axial projections 78 on which a ring 80 composed of a resiliently elastic material is supported and which is securely connected with the worm wheel 44 via two rivets 82. Together with a stirrup 83 which is connected with it—and which is in turn securely connected with the shaft 50 —the resiliently elastic ring 80 forms a universal coupling by means of which the worm wheel 44 and the shaft 50 are connected so as to be fixed against rotation relative to one another. As shown particularly by FIGS. 3 and 4, the shaft 50 sits in a bore hole of the stirrup 83 with one end. In addition, the stirrup 83 is connected with the ring 80 by means of rivets 84. The arrangement of the connecting rivets 84 between the ring 80 and the stirrup 83 is effected in such a way that they are arranged so as to be offset by 90 degrees between the fastening rivets 82 which hold the ring 80 at the worm wheel 44. The ring 80 is arranged between the axial projections 78 so as to be free with respect to the worm wheel 44 and at a distance 81 from the latter, so that it has sufficient play in order to compensate for alignment errors between the rotation axis 48 of the worm wheel 44 and the crank rotation axis 68 within the limits of its own elasticity and flexibility.

Figure 2:
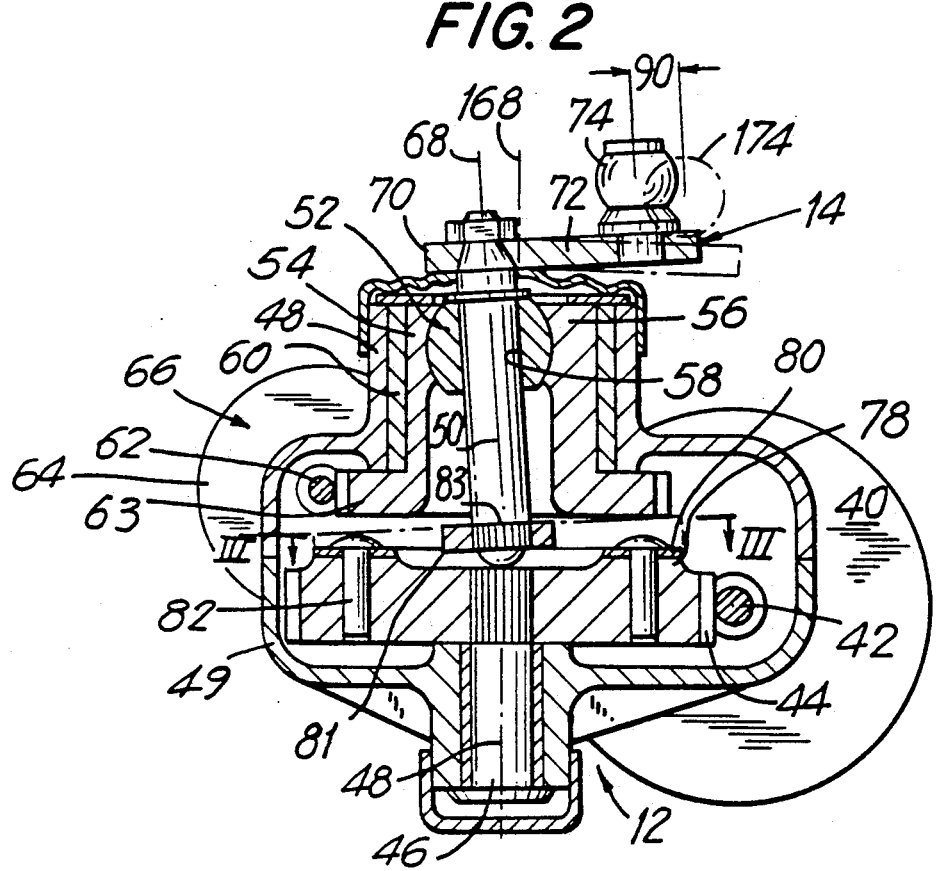
FIG. 2 shows a cross-sectional enlarged view of a gear unit belonging to a drive unit of the wiper device according to the invention.
Figure 7:
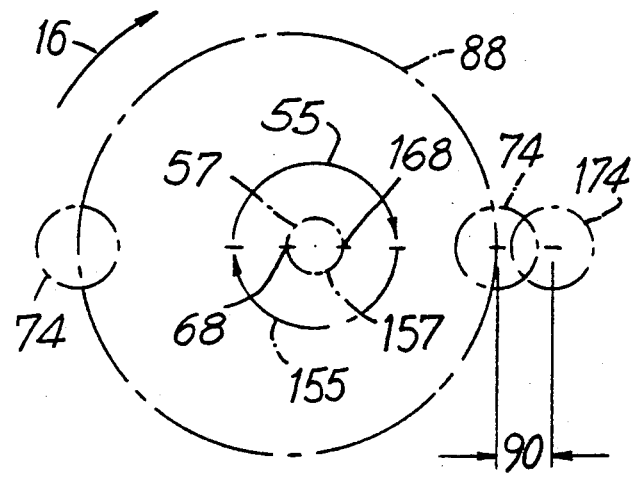
FIG. 7 shows a schematic view of the crank movement during the wiping operation and the crank position when the wiping blade is parked.

The operation of the wiper device will be described as follows. When the crank 14 is driven to rotate in the direction of the arrow 16 by the drive mechanism 12, all structural elements of the drive mechanism 12 are located in their positions shown in FIG. 2 with solid lines. The crank pin 74 rotates on a path 88 (FIG. 7) which is shown in dash-dot lines. The crank rotation axis is likewise provided with reference numeral 68 in FIG. 7. As long as the crank 14 rotates, the wiper blade 26 moves in a pendulum-like manner over the wiping field 36 between two reversing points, one of which visible reversing points is indicated in FIG. 1 by means of the wiper blade 26 itself. The alignment error between the crank rotation axis 68 and the worm wheel rotation axis 48 is compensated for by the elastic ring 80. When the drive mechanism 12 is turned off, the wiper blade 26 is moved into a so-called rest or parked position which is located prior to the wiping field 36 as seen in the direction of the pendulum movement. This rest position is shown in FIG. 1 by dashed lines and has been provided with reference numeral 27. The adjusting mechanism 66 is activated in order to move the wiper blade 26 into its rest position 27, wherein the eccentric bush 54 is rotated by 180° in the direction of arrow 55 (FIG. 7). The crank rotating axis 68 of the shaft 50 is shifted to an orbit designated by 57 in FIG. 7 so that the bearing 54, 58 of the shaft 50 lies eccentrically relative to the rotating guide 60 of the eccentric bush 54. The adjusting mechanism 66 is stopped after the eccentric bush 54 has been rotated 180 degrees. The arrangement of the eccentric bush 54 in the housing 48 is effected in such a way that the crank pin 74 carries out the maximum possible adjustment path in one direction. This adjustment path is designated by 90 in FIGS. 2 to 7. It corresponds to the arc-shaped path 57 in FIG. 7 which is likewise shown as a dash-dot line. In the adjusting position which has now been reached, the crank rotation axis 68 occupies a position which is shown in FIG. 2 in dash-dot lines and has been designated by 168. The crank pin 74 occupies an additional position which is shown in a dash-dot line in FIG. 2 and is designated by 174. If the arrangement just described above were transferred to the arrangement according to FIG. 1, it is clear that the crank 14 and, along with it, the crank pin 74 are displaced in the direction of the arrow 75 by means of rotating the eccentric bush 54 by 180 degrees, so that the rocker 20 arrives in a position, designated by 120 and shown in dash-dot lines, which position forces the wiper blade 26 into its rest position 27. The wiper blade 26 travels back a distance 77, so that it is placed prior to the wiping field 36 as seen in the one pendulum direction. The connection of the adjusting mechanism 66 is effected in such a way that the eccentric bush 54 is rotated further by 180° in the direction of the arrow 155 in FIG. 7, which arrow is shown in a dash-dot line, so that the crank rotation axis 168 again occupies its initial position 68. The restoring movement is effected on the arc-shaped path 157.

Figure 5:
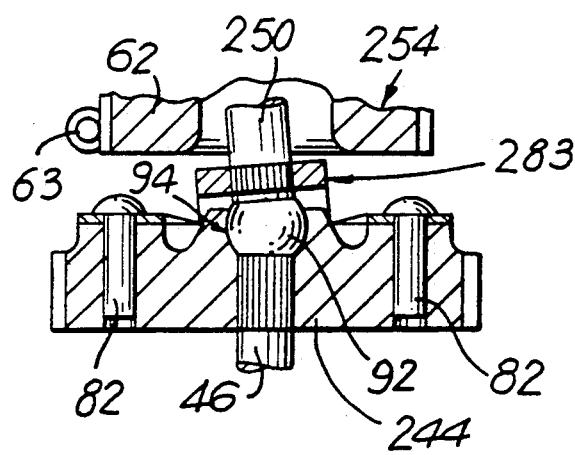
FIG. 5 shows a partial cross-sectional view similar to FIG. 2 of another embodiment of a gear unit
Figure 6:
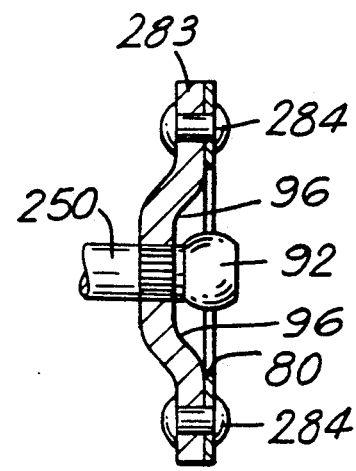
FIG. 6 shows a sectional view similar to FIG. 4 of the corresponding arrangement of the gear unit construction shown in FIG. 5.

In the embodiment, according to FIG. 5, which differs from the embodiment just described, the shaft 250 of the crank 14, not shown, is provided with an extension 92 deviating from the embodiment just described, the shaft penetrating the stirrup 283 with the extension 92. This extension 92 is constructed as a ball pivot, i.e. is appaused in a ball socket 94 which is constructed at the worm wheel 244. In order to provide the stirrup 283 and the shaft 250 with the necessary freedom of movement with respect to the worm wheel 244, the stirrup 283 is provided in its central area with a corresponding double bend 96 with which it bridges the ball socket 94. This construction provides a special support of the shaft 250 at its one end, while the shaft 50 is held at the worm wheel 44 in the manner of a universal coupling only via the ring 58 in the embodiment according to FIG. 2.

Figure 8:
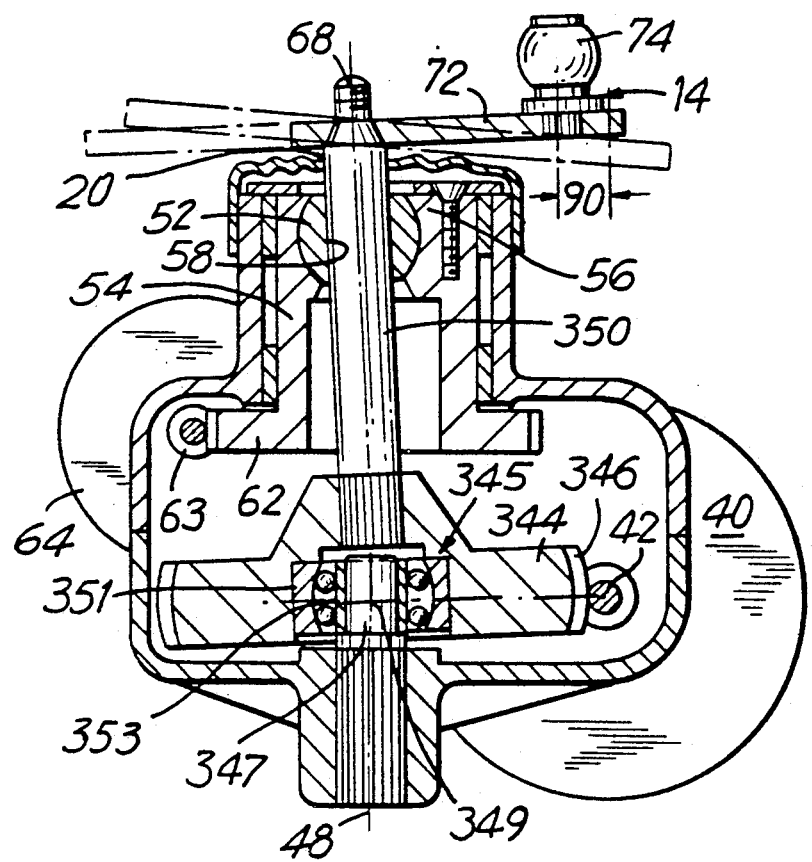
FIG. 8 shows a sectional view similar to FIG. 2 of another embodiment of a gear unit according to the invention.

In the additional embodiment of the invention according to FIG. 8, the shaft 350 of the crank 14 is securely connected with the worm wheel 344, wherein the axes of rotation of the shaft and worm wheel are aligned with one another. The worm wheel 344 is guided so as to be movable in a pendulum-like manner via a self-aligning ball bearing 345 on a bearing pin 347, which is stationary with respect to a frame, in order that the adjusting movement 90 caused by the rotation in the direction of (arrow 55) the eccentric bush 54 can be effected. The self-aligning center 349 lies in the area of the bearing 347. The outer ring 351 of the self-aligning ball bearing 345 is supported in a central recess of the worm wheel 344, while the inner ring 353 of the pendulum ball bearing 345 sits on the bearing pin 347. The toothing 346 of the worm wheel 344 is constructed so as to be convex and is arranged in such a way that its center of curvature at least approximately covers the axis of rotation of the worm wheel 344 with the pendulum center 349, so that an orderly cooperation of the worm gear unit 42, 344 is always ensured.

The operation of the wiper mechanism is described above as though the adjusting mechanism 66 could only be activated after the stopping of the drive motor 44. But this has only been done for the sake of improved clarity. It is expressly noted that the adjusting mechanism 66 can be switched on together with the drive motor 40, particularly when restarting the wiper device, so that the adjusting movement 157 (FIG. 7) of the crank rotation axis 68—which is identical with the adjusting movement of the crank pin 74—can be superposed on the pendulum movement 32 of the rocker 20. In this way, a quick cleaning of the wiping field is ensured.

Other advantages of the wiping device, according to the invention, consist e.g. in the high operating reliability of the wiper device which is achieved by functional separation of the pendulum drive from the displacing adjusting movement of the wiper, as well as in the high break-away moment which ensures the starting of a frozen wiper system.

While the invention has been illustrated and described as embodied in a vehicle windshield wiper device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly consitute essential characteristics of the generic or specific aspects of this invention.

What is claimed as new and desired to be protected by Letters Patent is set forth in the appended claims:

1. A wiper device for a vehicle windshield having a wiping field, said wiper device comprising a housing; a wiper blade movable over the wiping field between two oscillating reverse positions and having a rest position in which said wiper blade is located in front of the wiping field; a rocker shaft; a wiper arm for supporting said wiper blade on said rocker shaft; a drive mechanism for oscillating said rocker shaft, said drive mechanism including an electric motor, a crank operatively connected with said electric motor and said rocker shaft for translating a rotational movement of said electric motor into oscillating movement of said rocker shaft; a shaft for supporting said crank; and eccentric bushing for supporting said crank supporting shaft and pivotably supported in said housing for pivotal movement between two positions for displacing a pivotal axis of said crank between an operating position and an additional position in which a pivotal axis position influences the rest position of said wiper blade, said eccentric bush having a pot-shaped base for supporting said crank supporting shaft, and adjusting means for pivoting said eccentric bush and operating independently from said drive mechanism, said adjusting means including an electric drive motor and a worm gear drive including worm gear means formed on an outer surface of said eccentric bush.

2. A wiper device as set forth in claim 1, wherein said electric motor of said drive mechanism includes an armature shaft formed as a worm shaft, said drive mechanism further including a worm gear cooperating with said worm shaft for transmitting rotational movement of said worm shaft to said crank supporting shaft, said crank supporting shaft extending substantially in a direction of an axis of rotation of said worm gear means formed on the outer surface of said eccentric bush and having an end portion remote from said worm gear and received in said eccentric bush, said eccentric bush being arranged eccentrically with respect to a rotational axis of said worm ear, said wiper device further comprising coupling means located between said worm gear and a portion of said crank supporting shaft adjacent to said worm gear for transmitting rotational movement of said worm gear to said crank supporting shaft and for compensating misalignment between the rotational axis of said worm gear and the rotational axis of said worm gear means along which said crank supporting shaft extends.

3. A wiper device as set forth in claim 1, wherein said outer surface of said eccentric bush is pot-shaped and extends parallel to said pot-shaped base, said wiper device further comprising a spherical bearing supported in said pot-shaped base for supporting said crank supporting shaft.

4. A wiper device as set forth in claim 2, wherein said coupling means comprises a resilient ring that surrounds the rotational axes of said worm gear and said crank supporting shaft, said resilient ring including two spaced fastenings for securing said resilient ring to said worm gear and a fastening arranged between said two fastenings for connecting said resilient ring with said crank supporting shaft.

5. A wiper device as set forth in claim 4, wherein said resilient ring has two portions that contact said worm gear in areas of said two fastenings and a third portion extending between said two portions and spaced from said worm gear.

6. A wiper device as set forth in claim 5, wherein said worm gear includes two axial projections for supporting said resilient ring in the areas of said two fastenings.

7. A wiper device as set forth in claim 6, wherein said crank supporting shaft has a projection extending through said stirrup, said projection being formed as a ball pivot, said worm gear having a ball socket for receiving said ball pivot.

8. A wiper device as set forth in claim 4, wherein said wiper device further comprises a stirrup fixedly connected to said shaft, said fastening for connecting said resilient ring with said crank supporting shaft being arranged at said stirrup.

9. A wiper device as set forth in claim 4, wherein said fastening for connecting said resilient ring with said crank supporting shaft is offset by 90° relative to said two fastenings which are arranged diametrically opposite to each other.

10. A wiper device as set forth in claim 1, wherein said drive mechanism and said adjusting means are actuated simultaneously.

11. A wiper device as set forth in claim 1, wherein said electric motor of said drive mechanism includes an armature shaft formed as a worm shaft, said drive mechanism further including a worm gear cooperating with said worm shaft for transmitting rotational movement of said worm shaft to said crank supporting shaft, said crank supporting shaft extending substantially in a direction of an axis of rotation of said worm gear and having an end portion remote from said worm gear and received in said eccentric bush, said eccentric bush being arranged eccentrically with respect to a rotational axis of said worm gear, said crank supporting shaft being fixedly connected with said worm gear so that rotational axes of said crank supporting shaft and said worm gear coincide, said wiper device further comprising a bearing member fixedly supported in said housing for supporting said worm gear in such a manner that the rotational axis of said worm gear can oscillate about an oscillating center located in a region of said bearing member.

12. A wiper device as set forth in claim 11, wherein said bearing member is a self-aligning ball bearing, said wiper device further comprising a pin fixedly attached to said housing for supporting said self-aligning ball bearing thereon, said self-aligning ball bearing having an outer ring fixedly connected with said worm gear.

13. A wiper device as set forth in claim 11, wherein said worm gear has a convex toothing having a center of curvature that at least somewhat coincides with the oscillating center of the rotational axis of said worm gear.

* * * * *